United States Patent [19]

Cheung et al.

[11] Patent Number: 4,983,654
[45] Date of Patent: Jan. 8, 1991

[54] PHOSPHATE/EPOXY STABILIZER FOR EXTRUDABLE POLYESTER BLENDS

[75] Inventors: Mo-Fung Cheung, Farmington Hills; Amos Golovoy, Canton; Henk van Oene, Southfield, all of Mich.

[73] Assignee: Ford Motor Company, Dearborn, Mich.

[21] Appl. No.: 138,255

[22] Filed: Dec. 28, 1987

[51] Int. Cl.$^5$ .................... C08K 5/3492; C08G 8/10; C08G 8/28; C08G 59/40

[52] U.S. Cl. ................... 524/100; 524/291; 524/342; 252/400.21; 252/404; 528/59; 528/65; 528/393; 528/398; 548/112; 548/119; 549/219; 558/167; 558/176

[58] Field of Search .............. 528/65, 108, 72, 59, 528/393, 398, 96, 73; 549/218, 219, 220; 525/411, 438; 558/167, 176; 548/112, 119

[56] References Cited

U.S. PATENT DOCUMENTS

| | | |
|---|---|---|
| 2,541,027 | 2/1951 | Bradley ................... 528/108 |
| 3,422,063 | 1/1969 | Barton et al. ............ 528/108 |
| 4,066,611 | 1/1978 | Axelrod . |
| 4,256,844 | 3/1981 | Martin et al. ........... 528/108 |
| 4,565,833 | 1/1986 | Buszard et al. .......... 528/65 |
| 4,598,109 | 7/1986 | Sekmakas et al. ....... 528/108 |
| 4,613,661 | 9/1986 | Langet et al. ........... 528/108 |
| 4,696,952 | 9/1987 | Shimomura et al. ..... 528/65 |
| 4,722,955 | 2/1988 | Dick ....................... 524/101 |
| 4,801,628 | 1/1989 | Ashing et al. ........... 528/108 |

FOREIGN PATENT DOCUMENTS

| | | |
|---|---|---|
| 578093 | 6/1959 | Canada ................... 528/108 |
| 2828552 | 6/1978 | Fed. Rep. of Germany . |
| 2567137 | 1/1986 | France . |
| 0185631 | 10/1983 | Japan ...................... 524/109 |
| 1055922 | 1/1967 | United Kingdom ..... 528/108 |

OTHER PUBLICATIONS

Chemistry of Miscible Polycarbonate-Copolyester Blends; Smith, Barlow and Paul, Journal of Applied Polymer Science, vol. 26, 4233–4245, (1981).

Primary Examiner—Kriellion Morgan
Attorney, Agent, or Firm—Lorraine S. Melotik; Roger L. May

[57] ABSTRACT

This invention is directed to a stabilizer useful to retard transesterification in moldable polymer blends containing polyester(s) during processing of the blends at elevated temperatures, particularly at high temperatures above about 285° C. More particularly, the stabilizer comprises a phosphate-epoxy adduct. The stabilizer may optionally further comprise a reactive functionality component comprising a compound having a imide or oxazoline functionality and/or a hindered phenol component. The invention is also directed to a composition comprising the stabilizer and a particularly defined polymer blend.

4 Claims, No Drawings

PHOSPHATE/EPOXY STABILIZER FOR EXTRUDABLE POLYESTER BLENDS

TECHNICAL FIELD

This invention is directed to a stabilizer useful to retard transesterification in moldable polymer blends containing polyester(s) during processing of the blends at elevated temperatures, particularly at temperatures above about 285° C. More particularly, this stabilizer comprises a phosphate-epoxy adduct and optionally other components.

BACKGROUND OF THE INVENTION

Blending two or more plastic polymeric materials to achieve certain specific properties has become an important technology. Such polymer blends can be thought of as macromolecular plastic alloys. The polymeric materials of the blend are chosen so as to optimize the properties of the blend. For example, a high glass transition temperature ($T_g$) polymer characterized by exceptional toughness and poor solvent resistance might be blended with a polymer which has excellent solvent resistance but a lower $T_g$, where the latter polymer alone exhibits poor mechanical properties, e.g., tensile and flexural modulus. The resulting blend would be expected to have properties intermediate those of the individual blend constituents, the particular properties dependent on the proportions of the constituents.

Polyesters having aromatic moieties, e.g., polyarylates, are often employed as at least one of the polymers in such blends. Polyarylates are high temperature, high performance polymers which have a good combination of thermal and mechanical properties. Additionally, polyarylates have inherent combustion resistance as well as good weatherability. They also have good melt stability at high temperatures and good color retention. Still further, they have good processability which allows them to be molded into a variety of articles. Polyarylates have been blended with a number of other polymers, such as ABS resins (U.S. Pat. No. 3,792,118), polycarbonate resins (U.S. Pat. No. 3,792,115), polyurethane resins, methacrylate resins, etc. When there is an extreme of viscosity difference between a high viscosity polyarylate and the other polymer, severe surface irregularities (e.g., jetting) are observed when these blends are injection molded. This is observed especially when polyarylate is blended with, for example, ABS resins and poly(methyl methacrylate) resins Additionally, the extremely high viscosity of polyarylates prevents a uniform of product from being obtained by conventional polymer techniques, i.e., extrusion or Banbury type melt mixing, when the polyarylate is blended with a resin having a lower viscosity. The non-uniform blend will not weather as well as the uniform blend of the resins nor will it have an acceptable balance of properties. Still further, the inclusion of lower molecular weight constituents (which generally have lower melt viscosities) in order to lower the melt viscosity of the blend and make the blend more processable is generally at the expense of physical properties of the blend such as toughness. Therefore, it is preferred that the blend comprise constituents having molecular weights and melt viscosities similar to the polyarylate, e.g., polycarbonate. However, the relatively high melt viscosities of such blends makes them difficult to process at normal processing temperatures, i.e., normally below about 285° C. It is well known that the processability of such blends can be improved if the blends are molded at higher temperatures. However, at such higher temperatures, exchange reactions, such as alcoholysis, acidolysis, and transesterification, among the polyester(s) generally take place. Such reactions may take place when one or two or more different polyesters are present in the blend. The extent of such reactions effects the ultimate properties of the blend. In transesterification, an exchange of the ester moiety between two similar or different polyester molecules takes place which generates new molecular configurations, and hence a new composition. Transesterification during the melt-mixing of such blends results in poor mechanical properties and loss of crystallinity if the polyester is a semi-crystalline material. The product becomes embrittled and loses impact strength as compared to a product made from the same polymer blend in which transesterification did not occur.

French patent No.2,567,137 to Bonum and Logeat discloses incorporating esterified ortho-phosphoric acids into compositions comprising thermoplastic polyester pairs with different chemical structures, such as ethyleneglycol terephthalate and butanediol polyterphthlate-1,4 to prevent transesterification during molding thereof. It is also known that in blends containing polyesters, a residual catalyst generally remains from the polymerization which may accelerate, e.g., ester-carbonate, interchange reactions in the melt state. In *Chemistry of Miscible Polycarbonate-Copolyester Blends*, Smith, Barlow and Paul, Journal of Applied Polymer Science, Vol. 26, 4233–4245 (1981), it is taught that interchange reactions are greatly suppressed by deactivating the residual titanium catalyst with arsenic oxide additive. Usually, however, rather than adding compounds in an attempt to deactivate catalyts, workers in the art add any of numerous compounds to such polymer blends to improve the physical properties thereof. For example, in U.S. Pat. No. 4,066,611, it is taught that particular phosphorous compounds may be incorporated into a bisphenol A polycarbonate/poly(-tetramethylene terephthalate) blend to enhance the mechanical properties of the blend. U.S. Pat. No. 4,066,611 discloses that cyclic diphosphite compounds can improve the thermal-oxidative stability and hydrolytic stability of aromatic carbonate polymer compositions. However, attempts to prevent transesterification of polymer blends containing polyester during processing at elevated temperatures above about 280° C have been less than successful.

It is an object of the present invention to provide a stabilizer capable of retarding transesterification of ester containing polymer blends during melt-mixing and molding, particularly at the higher temperatures generally necessary to effectively process such blends. We have found an effective stabilizer comprising a phosphate-epoxy adduct wherein the phosphate is selected from specifically defined mono- and di-esters of ortho-phosphoric acid. Use of this stabilizer in polyesters and polymer blends containing polyesters allows them to be processed at higher temperatures without any deterioration in properties since it retards transesterification even at higher working temperatures (i.e., 285° C and above). The stabilizer of this invention may comprise, in addition to this phosphate-epoxy adduct, an imide or oxazoline containing compound. The stabilizer may further or alternately comprise a hindered phenol which provides thermal stability to the blend and is particularly useful at processing temperatures above about 300° C.

DISCLOSURE OF THE INVENTION

A stabilizer is disclosed which is useful to retard transesterification in compositions comprising polyester, particularly moldable polymer blends comprising polyester, wherein the stabilizer comprises a phosphate-epoxy adduct which is the reaction product of:

(A) phosphate being selected from mono- and di-esters of orthophosphoric acid, said mono- and di-ester respectively having two and one ionizable hydrogen atoms; and (B) epoxy;

wherein said phosphate and said epoxy are reacted in amounts so as to react at least about one of said ionizable hydrogen atoms of said phosphate with an epoxide group of said epoxy.

According to another aspect of this invention, the stabilizer further comprises, in addition to the phosphate-epoxy adduct described above, a reactive functionality component selected from compounds having (1) imide or (2) oxazoline functionality; and/or a hindered phenol component.

When the stabilizer further comprises the reactive functionality component and/or the hindered phenol component, the phosphate-epoxy adduct component comprises at least about 51 weight percent of the stabilizer. Preferably, the phosphate-epoxy component comprises between about 51 and about 75 weight percent of the stabilizer. The reactive functionality component is preferably selected from carbodiimides and styrene polymers comprising oxazoline functionality on their backbones.

According to yet another aspect of this invention, the stabilizer disclosed herein is useful to retard transesterification of polyester containing polymer blends during their processing at elevated temperatures, particularly at temperatures above about 285° C. This invention is also directed to such compositions comprising polyester, particularly polymer blends comprising polyester, and the stabilizer described above. One embodiment of such compositions comprises, in addition to the stabilizer, a polymer blend of:

(I) aromatic component selected from the group consisting of: polysulfone, polyarylsulfone, polyether ketone, polyester ether ketone and polyarylate, wherein the polyarylate is the reaction product of at least one dihydric phenol and at least one aromatic dicarboxylic acid;

(II) polyester being the reaction product of an aliphatic or cycloaliphatic diol, or mixtures thereof and at least one aromatic dicarboxylic acid; and (III) at least one thermoplastic polymer selected from the group consisting of an aromatic polycarbonate, a styrene resin, a vinyl chloride polymer, a poly(arylether), a copolyetherester block copolymer, and a polyhydroxyether.

Preferably, at least (II) or (III) has the ability to crystallize upon cooling.

The above defined polymer blend composition comprises at least about 0.1 weight percent phosphate-epoxy adduct component. As disclosed above, the stabilizer may further comprise reactive functionality and/or hindered phenol component. If the stabilizer comprises reactive functionality component, the composition preferably comprises at least about 0.01 weight percent reactive functionality component. If the stabilizer comprises hindered phenol component, the composition preferably comprises at least about 0.01 weight percent hindered phenol component. The weight percent of each stabilizer component is based on the weight of the polymer blend of the composition. If the stabilizer comprises reactive functionality component and/or hindered phenol component, the phosphate-epoxy component comprises, as described above, at least 51 weight percent of the stabilizer. Preferably the polymer blend comprises a blend of polyarylate, polyethylene terephthalate and polycarbonate.

Advantageously, the stabilizer of this invention retards transesterification in polymer blends comprising polyester which allows the blends to be desirably processed at temperatures above 285° C with substantially no change in physical properties. Since the polymer blend can be processed at higher temperatures, it may advantageously be composed of polymers having higher molecular weights, which polymers generally also have more desirable physical properties, such as toughness and impact resistance. As pointed out above, such high molecular weight polymers have melt viscosities at normal processing temperatures which preclude their use in most applications. While a phosphate is somewhat useful by itself to retard transesterification of polyester blends at moderate temperatures up to about 280° C., the phosphate-epoxy adduct of this invention is capable of preventing transesterification, even at temperatures higher than about 285° C., and even above about 300° C.

The stabilizer of this invention retards transesterification of the polyester present in the polymer blend during processing, i.e., melt-mixing and molding, of the blend. Because transesterification is substantially prevented and the polyester present in the blend does not undergo any significant change in its structure during processing, it is now possible to recycle in a second transformation, the polymer scrap produced by the first transformation. Moreover, the same mechanical and thermal properties can be obtained independent of the length of time the blend composition is maintained at the high temperature in the molding apparatus, e.g., an extruder, which time can vary considerably depending on the type and size of the part being molded as well as the molding technique employed. Presently, in order to somewhat limit the deterioration of compositions comprising polyester, they are maintained at elevated temperatures for relatively short periods of time. Incorporating the stabilizer of this invention into polymer blends comprising polyester allows the composition to be processed at higher temperatures and for longer periods of time without any significant change in the physical properties of the polymer blend, which has definite commercial advantages. For example, we have found that a polyarylate, polyethylene terephthalate, polycarbonate blend comprising an phosphate-epoxy adduct/carbodiimide/hindered phenol stabilizer has excellent thermal stability and can crystallize even after prolonged exposure to high temperatures, i.e., 30 minutes at 300° C. The same blend without the stabilizer loses its individual glass transition temperature as well as crystallinity even after 10 minutes at 280° C.

DETAILED DESCRIPTION OF THE INVENTION

The stabilizer of this invention comprises a phosphate-epoxy adduct (component) and, optionally, may comprise a reactive functionality component selected from compounds having (1) imide or (2) oxazoline functionality and/or hindered phenol component. If the composition is to be molded at temperatures above about 300° C, it preferably includes the hindered phenol component. Each of these components as well as the polymer blend will hereinafter be discussed in greater detail.

The phosphate-epoxy adduct component is the reaction product of: (A) phosphate and (B) epoxy. The phosphate is selected from mono- and di-esters of orthophosphoric acid. As is known to those skilled in the art, the mono- and di-ester respectively have two and one ionizable hydrogen atoms. The phosphate and epoxy are reacted in amounts so as to react at least about one of the ionizable hydrogen atoms of the phosphate with an epoxide group of the epoxy. That is, in the case of the mono- ester, which has two hydrogen atoms which are ionizable, at least one of the hydrogen atoms would be reacted with an epoxide group of the epoxy compound. The epoxy could be reacted in an amount so as to react more than one of the hydrogen atoms, up to an amount which would react both of the hydrogen atoms. In the case of the di-ester, which has one hydrogen atom which is ionizable, the epoxy would be reacted in an amount which would react this one hydrogen atom. In a reaction mixture of the phosphate/epoxy reaction mixture, the epoxy can be present in excess. The phosphate component may be selected from any mono- or di-ester, many of which are commercially available, or mixtures of any of them. In the case when the phosphate is a mixture of mono- and di-esters, the epoxy and ester are reacted in amounts so as to react at least one of the ionizable hydrogens of the esters of the mixture. As is known to those skilled in the art, the reaction of an epoxide group of the epoxy reactant with an ionizable hydrogen (i.e., an acid group) of the phosphate reactant generates a hydroxyl group. The phosphate ester comprises ester functionality which may comprise groups selected, e.g., alkyl and aryl groups such as ethyl, propyl, butyl, pentyl, phenyl, p-methyl phenyl, and stearyl and the like. Particularly preferred of these mono- or di-esters are those which contain at least one phenyl group, since such compounds containing phenyl groups generally are relatively more stable at high temperatures. Exemplary of such mono- and di-esters are diphenyl phosphate, dibenzyl phosphate, naphthol AS BI phosphate, with diphenyl phosphate being preferred in making the phosphate-epoxy adduct for use in the polyarylate, polyethylene terephthalate, polycarbonate polymer blend described herein.

The epoxy may be selected from monoepoxides or polyepoxides. Epoxy material are well know to those skilled in the art and many are commercially available. Exemplary of monoepoxides are those whose carbon chain may be interrupted by oxygen or be hydroxy substituted and glycidyl esters and glycidyl ethers. Examples of such monoepoxies which may be employed are the alkylene oxides such as propylene oxide, ethylene oxide and 1,2-epoxy decane, styrene oxide, cyclohexene oxide, glycidol acetate and glycidol. The preferred monomer preferably has no hydroxyl functionality. The epoxy may also be selected from polyepoxides having two or more epoxide groups. From the view of availability and cost consideration, however, two appears to be preferable. The molecular weight of such epoxies generally is between about 300 and 10,000. The polyepoxide compounds used may be polyglycidyl ethers of polyhydric phenols, such as for example, pyrocatechol. In particular, one class of suitable epoxy compounds for the epoxy includes the reaction product of di or polyhydric, mono, di or polycyclic compounds with epihalohydrins of the formula

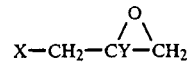

wherein X is halogen such a chloro and Y is hydrogen or lower alky such as methyl or ethyl, which epihalohydrin reaction products are exemplified by such straight chain epoxy terminated compound containing glycidyl ether groups as bis-phenol-A-epichlorohydrin reaction products that are commercially available such as, for example, under the Epon (trademark) series, e.g., Epon 828, 832, 836, 1001, 1004 or 1007 (marketed by Shell Chemical Co.) or the Araldite (trademark) series, e.g., Araldit 6010, and 8001 (marketed by Ciba-Geigy). Included in the group of suitable polyepoxide compounds containing more than two epoxide groups are the novolac epoxy resins, e.g., Epon 1138 and 1139 (trademark) and Cresol novolac Araldite ECN 1235 and 1273 (trademark, Ciba-Geigy). Compatible mixtures of any of these epoxy compounds are also suitable. Techniques for reacting phosphate and epoxy are well known to those skilled in the art. Selection of the optimal technique for such reaction will be apparent in view of the present disclosure.

An optional component of the stabilizer of this invention comprises a compound having reactive functionality selected from imide and oxazoline. Such functionalities are capable of reacting with a hydroxyl or carboxyl group. This optional component comprises a compound (1) having one or more of such functionalities, (2) which is soluble in the polymer blend and (3) which has thermal stability at the processing temperatures of the blend. This compound may thus, for example, be selected from carbodiimides such as benzene,2,4,-diisocyanate-1,3,5-tris(1-methyl-ethyl)-homopolymer, 2,2'-dimethyl-4,4'-dinitrodiphenyl-carbodiimide, 2,2',6,6'-tetrachloro-diphenylcarbodiimide, and 2,2'-dinitro-4,4'-dichloro-diphenylcarbodiimide. The first named carbodiimide is preferred for use in the preferred polymer blend comprising polyarylate, polyethylene terephthalate, and polycarbonate. Exemplary of compounds containing the oxazoline functionality are reactive polystyrene, i.e., polymeric styrene having oxazoline functionality on its backbone, obtained from Dow Chemical Co., Midland, MI. The reactive functionality (optional) component of the stabilizer may also comprise mixtures of any of the various suitable compounds described above. Selection of still other materials useful as this component would be apparent to those skilled in the art in view of the present disclosure. Numerous such materials are known and many are commercially available.

The stabilizer optionally comprises a hindered phenol. Numerous such materials are known and are commercially available, e.g., octadecyl-3,5-di-tertbutyl-4-hydroxy-hydrocinnamate, 1,3,5-tris(4-tert-butyl-3-hydroxy-2,6-dimethylbenzyl) -1,3,5-triazine-2,4,6-(1H,-3H,5H)-trione, and 1,3,5-trimethyl-2,4,6-tris(3,5-ditertbutyl-4-hydroxy-benzyl) benzene, the last one being preferred in the invention composition for use with the preferred polymer blend of polyarylate, polyethylene terephthalate and polycarbonate. The hindered phenol component, when employed as a component in the stabilizer, serves to improve the thermal stability of the polymer blend composition employing the stabilizer. Incorporation of a hindered phenol component is particularly advantageous when the composition is to be subjected to temperatures above about 300° C. during processing, e.g., during the melt-mixing or molding of the blend.

As disclosed above, if the stabilizer comprises the reactive functionality component and/or the hindered phenol component in addition to the phosphate-epoxy adduct, the stabilizer comprises a major weight proportion, i.e., greater than about 51 weight percent, of the phosphate-epoxy adduct component. Preferably, the phosphate-epoxy adduct component comprises between about 51 and about 75 weight percent of the stabilizer. This stabilizer retards transesterification in extrudable compositions containing polyester during the processings of such compositions. In view of the present disclosure, it will be apparent to those skilled in the art that any composition containing polyester could benefit from the incorporation of the stabilizer of this invention therein, such compositions being numerous and varied. Exemplary of one embodiment of this type of composition, and one which particularly benefits from inclusion of the stabilizer since it is generally processed at the high temperatures which encourage transesterification, are those compositions comprising a polyester blend of:

(I) aromatic component selected from the group consisting of polysulfone, polyarylsulfone, polyether ketone, polyesterether ketone and polyarylate, wherein the polyarylate is the reaction product of at least one dihydric phenol and at least one aromatic dicarboxylic acid;

(II) polyester being the reaction product of an aliphatic or cycloaliphatic diol, or mixtures thereof, and at least one aromatic dicarboxylic acid; and (III) at least one thermoplastic polymer selected from the group consisting of an aromatic polycarbonate, a styrene resin, a vinyl chloride polymer, a poly(aryl ether), a copolyetherestic block copolymer, and a polyhexdroxy ether.

Such compositions comprise the phosphate-epoxy adduct in at least about 0.1 weight percent, preferably between about 0.1 and about 3 weight percent, more preferably between about 0.4 and about 1.0 weight percent. The composition preferably comprises reactive functionality component wherein the composition preferably comprises at least about 0.01 weight percent of the reactive functionality component, preferably between about 0.01 and about 1 weight percent, more preferably between about 0.1 and about 0.5 weight percent. When a hindered phenol is employed in such compositions, the composition preferably comprises at least about 0.01 weight percent of the hindered phenol component, preferably between about 0.1 and about 1 weight percent, more preferably between about 0.1 and about 0.5 weight percent of this optional component. The weight percent of each stabilizer component is individually based on the weight of the polymer blend of the composition.

The components of the stabilizer may be combined to form the system in any suitable manner according to techniques known to those skilled in the art. For example, the stabilizer of this invention may be made by dry blending the stabilizer component(s) into a powdered mixture which is then available to be dusted into the polymer blend prior to loading the composition into the melt-mixing apparatus. The order of combination of any components of the stabilizer is not critical. Alternately, the stabilizer components can be added individually into the composition blend or pre-compounded with one of the polymer blend components. The stabilizer can also be metered into the polymer blend composition as it is being melt-mixed in the appropriate apparatus, e.g., into an extruder barrel downstream port.

COMPONENT I

Polysulfones that may be employed in the practice of the present invention are high molecular weight polymers containing sulfone groups. The polyarylsulfones additionally contain aromatic nuclei in the main polymer chain. Polysulfones and polyarylsulfones are rigid, strong thermoplastic materials that can be molded, extruded, and thermoformed into a variety of shapes. They are highly resistant to chemicals, heat, oxidation and hydrolysis. Numerous such materials are known to those skilled in the art and many are commercially available. For example, the Amoco Corporation manufactures and sells polysulfones under the trademark Udel. The polyarylsulfones which may be suitably employed in the practice of this invention are commercially available from various sources, including Amoco which markets a product under the trademark UDEL polysulfone and from I.C.I. U.S. Inc. which markets such materials in various grades having different performance characteristics.

Polyether ketones and polyesterether ketones useful in the present invention as the aromatic component may be selected from any of numerous known materials of these types. Such materials are commercially available from I. C. I. U.S. Inc. under the trademark Victrex.

The polyarylates suitable for use herein are derived from a dihydric phenol and an aromatic dicarboxylic acid. Exemplary of polyarylates are those made by reaction of bisphenol-A and aromatic dicarboxylic acids such as terephthalic acid, isophthalic acid, naphlhalene dicarboxylic acid as well as mixtures thereof. The polyarylates of the present invention can be prepared by any of the well known prior art polyester forming reactions, such as the reaction of the acid chlorides of the aromatic dicarboxylic acid with the dihydric phenol, the reaction of the diaryl ester of the aromatic dicarboxylic acids with the dihydric phenols, and the reaction of the aromatic diacids with diester derivatives of the dyhydric phenol. These processes are described, for example, in U.S. Pat. Nos. 3,317,464, 3,948,856, 3,780,148, 3,842,213.

COMPONENT II

The polyesters of the extrudable composition described herein are derived from an aliphatic or cycloaliphatic diol, or mixtures thereof, containing from 2 to about 10 carbon atoms and at least one aromatic dicarboxylic acid. The polyesters as described herein can be produced by methods well known in the art. Numerous such polyester are known to those skilled in the art and many are commercially available. The preferred dicarboxylic acid employed to make the polyester is terephthalic acid or mixtures of terephthalic and isophthalic acid. The preferred polyesters are poly(1,4-cyclohenanedimethanol tere/iso/-phthalate) and a copolyester of 1,4-cyclohexanedimethanol, ethylene glycol and terephthalic acid and poly(ethylene terephthalate). The polyester component may also comprise in minor amounts, from about 0.5 to about 2 percent by weight, of the reaction product of aliphatic acids and/or aliphatic polyols, to form copolyesters. The aliphatic polyols include glycols such as poly(ethylene glycol). Copolyesters are those derived from aliphatic dicarboxylic acids including cycloaliphatic straight and branched chain acids. In addition, there can be minor amounts of units derived from aliphatic glycols and polyols.

COMPONENT III

The thermoplastic polymers suitable for use in this invention are selected from the group consisting of an aromatic polycarbonate, a styrene resin, an alkyl acrylate resin, a vinyl chloride polymer, a poly(aryl ether), a copolyetherester block polymer, a polyhydroxyether, or mixtures thereof.

POLYCARBONATE

The thermoplastic aromatic polycarbonates that can be employed herein are homopolymers and copolymers and mixtures thereof which have an intrinsic viscosity of 0.40 to 1.0 dl./g. as measured in methylene chloride at 25° C that are prepared by reacting a dihydric phenol with a carbonate precursor. The polycarbonates can be prepared by methods well known to those skilled in the art. Typical of some of the dihydric phenols that may be employed in the practice of this invention are bisphenol-A (2,2-bis(4-hydroxyphenyl) propane), bis(4-hydroxyphenyl) methane, 2,2-bis(4-dydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,5',5'-tetrabromo-4,4'-dihydroxydiphenyl)-propane, (3,3'-dichloro-4,4'-dihydroxydiphenyl) methane. It is of course, possible to employ two or more different dihydric phenols or a copolymer of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. Typical of the carbonate esters which may be employed herein are diphenyl carbonate, di-(halophenyl) carbonates, and di-(alklyphenyl) carbonates. The haloformates suitable for use herein include bis-haloformates of dihydric phenols or glycols. While other carbonate precursors will occur to those skilled in the art, carbonyl chloride, also known as phosgene, is preferred.

STYRENE RESIN

The styrene resins suitable for use herein are ABS type polymers, the molecules of which consist of two or more polymeric parts of different compositions that are bonded chemically. The polymer is preferably prepared by polymerizing a conjugated diene such as butadiene or a conjugated diene with a monomer copolymerizable therewith such as styrene to provide a polymeric backbone. After formation of the backbone, at least one grafting monomer and preferably two are polymerized in the presence of the prepolymerized backbone to obtain the graft polymer.

The backbone polymer, as mentioned, is preferably a conjugated diene polymer such as polybutadiene polyisoprene, or a copolymer such as butadiene styrene, butadiene-acrylonitrile, or the like. Exemplary of the monomers generally utilized in preparing the backbone of the polymer are butadiene; isoprene; 1,3-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. The preferred conjugated diene utilized herein is butadiene.

One group of monomers that may be polymerized in the presence of the prepolymerized backbone are preferably monovinylaromatic hydrocarbons. Examples of the monovinylaromatic compounds and substituted monovinylaromatic compounds that may be used are styrene and other vinyl substituted aromatic compounds including alkyl-, cycloalkyl-, aryl-, alkaryl-, aralkyl-, alkoxy-, aryloxy-, and other substituted vinylaromatic compounds. The preferred monovinylaromatic hydrocarbons used herein are styrene and/or α-methylstyrene.

A second group of monomers that may be polymerized in the presence of the prepolymerized backbone are acrylonitrile, substituted acrylonitrile and/or acrylic acid esters exemplified by acrylonitrile and alkyl acrylates such as methyl methacrylate. The preferred acrylic monomer used herein is acrylonitrile and the preferred acrylic acid esters are ethyl acrylate and methyl methacrylate.

In the preparation of the graft polymer, the conjugated diolefin polymer of copolymer exemplified by 1,3-butadiene polymer or copolymer comprises from about 50% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition and the monovinylaromatic hydrocarbon exemplified by styrene comprise from about 30 to about 70% by weight of the total graft polymer composition.

Optionally, the elastomeric backbone may be an acrylate rubber such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

ALKYL ACRYLATE RESIN

The alkyl acrylate resin useful in the present invention includes a homopolymer of methyl methacrylate (i.e., polymethyl methacrylate) or a copolymer of methyl methacrylate with a vinyl monomer (e.g., acrylonitrile, N-allylmaleimide, N-vinly malemide, or an alkyl acrylate or methacrylate in which the alkyl group contains from 1 to 8 carbon atoms such as methyl acrylate, ethyl acrylate, butyl acrylate, ethyl methacrylate and butyl methacrylate). The amount of methyl methacrylate is not less than 70% by weight of this copolymer resin.

The alkyl acrylate resin may be grafted onto an unsaturated elastomeric backbone such as polybutadiene, polyisoprene, and/or butadiene or isoprene copolymers. In the case of the graft copolymer, the alkyl acrylate resin comprises greater than 50 weight percent of the graft copolymers.

VINYL CHLORIDE POLYMERS

Vinyl chloride polymers for the purpose of this invention are polyvinyl chloride and copolymers of vinyl chloride with olefinically unsaturated polymerisable compounds which contain at least 80 percent by weight of vinyl chloride incorporated therein. Olefinically unsaturated compounds which are suitable for copolymerization are, for example, vinylidene halides such as vinylidene chloride and vinylidene flouride, vinyl esters such as vinyl acetate, vinyl propionate, vinyl butyate, vinyl chloroacetate, vinyl benzoate, acrylic and α-alkylacrylic acids and their alkyl esters, amides and nitriles, methacrylic acid, methyl methacrylate, ethyl acrylate, 2-ethyl-hexylacrylate, butyl methacrylate, acrylamide, N-methyl acrylamide, acrylonitrile and methacrylonitrile, aromatic vinyl compounds such as styrene and vinyl naphthalene and olefinically unsaturated hydrocarbons such as ethylene, bicyclo-[2,2,1]-hepta-2-ene and bicyclo-[2,2,1]-hepta-2,5-dienes. These vinyl chloride polymers are known and can be prepared by the usual methods of emulsion, suspension, bulk or mass polymerisation. Vinyl chloride polymers which have molecular weights of 40,000 to 60,000 are preferred.

POLY(ARYL ETHER)S

The poly(aryl ether) resin component of the blend of this invention may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either of both of which contain a sulfone linkage —$SO_2$— between arylene groupings to provide sulfone units in the polymer chain in addition to arylene units and ether units.

Typical examples are the reaction products prepared from 2,2-bis-(4-hydroxyphenyl) propane with 4,4'-dichlorodiphenylsulfone and equivalent reaction products such as those from 4,4'-dichlorodiphenylsulfone with bisphenol of benzophenone (4.4'-dihydroxydiphenyl ketone), or the bisphenol of acetophenone 1,1-bis(4-hydroxyphenyl) ethane], or the bisphenol of vinyl cyclohexane [1-ethyl-1-(hydroxyphenyl)-3-(4-hydroxyphenylcoclohexane)], or 4,4'-dihydroxydiphenyl sulfone or alpha, alpha'-bis(4-hydroxyphenyl)-p-diisopropylbenzene.

COPOLYETHERESTER BLOCK COPOLYMER

The polyetheresters consist essentially of a multiplicity of recurring intralinear long chain and short chain ester units connected head-to-tail through ester linkages, said long chain ester units being represented by the following structure:

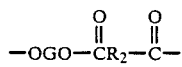

and said short chain ester units being represented by the following structure

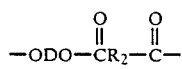

wherein: G is a divalent radical remaining after removal of terminal hydroxy groups from a poly(alkylene oxide) gylcol having a molecular weight of about 400–3,500: D is a divalent radical remaining after removal of hydroxyl groups from a low molecular weight diol having amolecular weight less than about 250; and $R_2$ is a divalent radical remaining after removal of carboxyl groups from a dicarboxylic acid having a molecular weight less than about 300; with the provisos that the short chain ester units constitute about 25–65% by weight of the copolyester, at least about 70% of the $R_2$ groups must be 1,4-phenylene radicals, at least about 70% of the D groups must be the 1,4-butylene radicals, and the sum of the percentages of the $R_2$ groups which are not 1,4-phenylene radicals and of the D groups which are not 1,4-butylene radicals cannot exceed about 30%.

Included among the low molecular weight diols (other than 1,4-butanediol) which react to form short chain ester units are acyclic, alicyclic and aromatic dihydroxy compounds.

Dicarboxylic acids (other than terephthalic acid) which are reacted with the foregoing long chain glycols or low molecular weight diols to produce the copolyesters of this invention are aliphatic, cycloaliphatic or aromatic dicarboxylic acids of a low molecular weight. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anyhydrides. The molecular weight requirement pertains to the acid and not to its equivalent ester or ester-forming derivative. Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., terephthalic and isophthalic acids.

The most preferred copolyesters of this invention are those prepared from dimethylterephthalate, 1,4-butanediol and poly(tetramethylene oxide) glycol having a molecular weight from about 600–1,500.

POLYHYDROXYETHER

The thermoplastic polyhydroxyethers in the present invention have the general formula

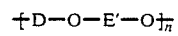

wherein D is the radical residuum of a dihydric phenol, E' is a radical residuum of an epoxide selected from mono- and diepoxides and contains from 1 to 2 hydroxyl groups and n is an integer which represents the degree of polymerization and is at least 30 and preferably is above about 80.

In general, thermoplastic polyhydroxyethers are prepared by contacting under polymerization conditions a dihydric phenol and an epoxide containing from 1 to 2 epoxide groups in substantially equimolar amounts. These polyhydroxy ethers are prepared by methods well known in the art such as those detailed in, for example, U.S. Pat. Nos. 3,238,087; 3,305,528; 3,294,747, and 3,277,051.

U.S. Pat. No. 4,259,458 is hereby expressly incorporated herein by reference for its teachings relative the materials of Components I, II and III disclosed above.

In one embodiment of the extrudable composition blend employed with the stabilizer of the present invention, the first component (I), which is preferably a polyarylate, is preferably used in amounts of from about 4 to about 80, more preferably from about 40 to about 60 weight percent. The second component (II), the polyester, is preferably used in amounts of from about 4 to about 60, more preferably from about 10 to about 45 weight percent. The thermoplastic polymer is preferably used in amounts of from about 10 to about 92, more preferably from about 10 to 60 weight percent.

The stabilizer may be incorporated into the composition as described above, either before or during processing of the composition according to any of the known techniques. It should, of course, be apparent to those skilled in the art that other additives may be included in the present compositions. These additives include plasticizers; pigments; flame retardant additives; reinforcing agents, such as glass fibers; thermal stabilizers; ultraviolet light stabilizers processing aids, impact modifiers and the like. Useful flame retardant materials include decabromodiphenyl ether and triarylphosphates, such as triphenylphosphate, and halogen monomer organic compounds such as tetrafluoro-phthalic acid or tetrabromo-phthalic anhydride, bis-(di- or pentabromophenyl) oxide, these organic compounds eventually being associated with compounds with synergic effect such as antimonium anhydride. Polymeric compounds especially, e.g., bromide polystyrene and bromide polycarbonates are also suitable as flame retardants. The impact modifiers which can be used are described in U.S. Patent application Ser. No. 049,131 of L. M. Robeson, titled "Impact Modified Polyarylate Blends", filed June 18, 1979. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The invention will be further understood by referring to the following detailed examples. It should be understood that the specific examples are presented by way of illustration and not by way of limitation. Unless otherwise specified, "parts" is intended to mean "parts by weight".

EXAMPLE 1

A. A phosphate-epoxy adduct according to this invention is prepared as follows:

To a three-neck round bottom flask equipped with a thermometer and a drying tube is charged 19.2 parts of Epon 1001 (trademark, Shell Chemical Co., an epoxy resin which comprises a bis-phenol-A-epichlorhydrin reaction product) and 10 parts of diphenyl phosphate in 116.8 parts of acetone. The system is blanketed with nitrogen and stirred overnight. A light brown solution is obtained.

B. A polyester blend composition comprising the phosphate-epoxy adduct "A" prepared above and carbodiimide is made from the following materials:

| Raw Materials | Parts by Weight |
| --- | --- |
| Ardel[1] (D-100) | 50 |
| Calibre[2] (300-15) | 20 |
| Cleartuf[3] (1006B) | 30 |
| Solution "A" | 2.5 |

-continued

| Raw Materials | Parts by Weight |
| --- | --- |
| Carbodiimide | 0.25 |

[1]Trademark, Amoco Performance Products, Inc., Ridgefield, CT, polyarylate
[2]Trademark, Dow Chemical Co., Midland, MI, polycarbonate
[3]Trademark, Goodyear Tire and Rubber Co., Akron, OH, polyethylene terephthalate Solution "A" is added to the polyethylene terephthalate and is vacuum dried at 110° C. The ingredients are premixed and dried in a vacuum oven at 110° C. The above composition is melt extruded in a Haake mini-extruder at 290° C.

Differential Scanning Calorimetry (DSC) is used to evaluate the stability of the extrudate. The criteria for stability are the retention of the crystalline heat of fusion and the melting point of the polyethylene terephthalate. The glass transition temperatures of polycarbonate and polyarylate may essentially be masked by the cold crystallization exotherm of the polyethylene terephthalate.

The resulting extrudate gives excellent thermal stability and can crystalize after prolonged exposure at high temperature (i.e., 30 minutes at 300° C).

When the solvent in part "A" is evaporated and 0.5 parts of the dried compound (from "A") is used in forming the composition of "B", a similar result is obtained.

The same polymer blend composition without stabilizer loses its individual glass transition temperature as well as crystallinity under the same test conditions which is a strong indication that an extensive ester exchange reaction takes place without stabilizer.

EXAMPLE 2

A polymer blend composition comprising phosphate-epoxy adduct and carbodiimide is prepared as in Example 1B and extruded in a Haake mini-extruder at 315° C. The extrudate gives excellent thermal stability and can crystalize.

A similar polymer blend composition is made but without stabilizer. It is extruded in a Haake mini-extruder at 315° C. This extrudate exhibits poor impact resistance and cannot crystallize. Its solvent resistance is also poor.

EXAMPLE 3

A. A phosphate-epoxy adduct according to this invention is prepared as follows:

A three-neck round bottom flask is equipped with a thermometer, an inert gas tube, and a drying tube. 6.6 parts of Epon 1001 (trademark, Shell Chemical Co., an epoxy resin which comprises a bis-phenol-A-epichlorohydrin reaction product) is dissolved in 397 parts of acetone. The solution is stirred by a magnetic stirrer. 34 parts of diphenylphosphate is added incrementally. The whole stystm is blanketed with dried nitrogen stirred for at least 24 hours. The solution is then decanted and the acetone is dried by evaporation. The final adduct is further dried in vacuo for at least 24 hours. An infrared spectrum reveals that the epoxide absorption at wave number 925 and 862 disappears at the end of the reaction.

The following ingredients are premixed and dried in a vacuum oven at 110° C.:

| Raw Materials | Parts by Weight |
| --- | --- |
| Ardel[1] (D-100) | 50.0 |

-continued

| Raw Materials | Parts by Weight |
| --- | --- |
| Calibre[2] (300-15) | 20.0 |
| Cleartuf[3] (1006B) | 28.3 |
| KE7646 | 1.7 |
| Adduct Ex. 3A | 0.5 |

[1]Trademark, Amoco Performance Products, Inc., Ridgefield, CT, polyarylate
[2]Trademark, Dow Chemical Co., Midland, MI, polycarbonate
[3]Trademark, Goodyear Tire and Rubber Co., Akron, OH, polyethylene terephthalate
[4]KE7646 is a concentrate of polyethylene terephthalate with 15% of Aromatic polycarbodiimide (P-100) from Mobay Chemical Co., Rhein-Chemie Div., Mogadove, OH.

The mixture is then charged into a Haake mini extruder and extruded to form a polyester blend. The maximum temperature setting for the extruder is 290° C.

The extrudate is evaluated by DSC as outlined in the following isothermal test and the test results are listed below:

ISOTHERMAL TEST

The sample is first rapidly scanned at a rate of 20° C./min. and then isothermally held at the maximum temperature for a specific period of time. The sample is then cooled to ambient temperature and rescanned at a slower rate of 5° C./minute from 30° C. to 280° C.

| Isothermal Test. | $\Delta H_f$(J/g) | Tm(°C.) |
| --- | --- | --- |
| Original | 13.6 | 252.4 |
| 30 min./300° C. | 8.6 | 248.3 |

EXAMPLE 4

A. The procedure of Example 3A is repeated with the following changes: 28.6 parts of Epon 825 (trademark, Shell Chemical Co., epoxy resin) is dissolved in 286 parts of acetone and 71.4 parts of diphenylphosphate is added incrementally into the solution with stirring. The reaction is continued for at least 24 hours at ambient temperature. The solution is used without drying.

The following first four ingredients are premixed and dried in a vacuum oven at 110° C.:

| Raw Materials | Parts by Weight |
| --- | --- |
| Ardel[1] (D-100) | 50.0 |
| Calibre[2] (300-15) | 20.0 |
| Cleartuf[3] (1006B) | 28.3 |
| KE7646 | 1.7 |
| Solution Adduct Ex. 4A | 9.5 |

[1]Trademark, Amoco Performance Products, Inc., Ridgefield, CT, polyarylate
[2]Trademark, Dow Chemical Co., Midland, MI, polycarbonate
[3]Trademark, Goodyear Tire and Rubber Co., Akron, OH, polyethylene terephthalate
[4]KE7646 is a concentrate of polyethylene terephthalate with 15% of Aromatic polycarbodiimide (P-100) from Mobay Chemical Co., Rhein-Chemie Div., Mogadove, OH.

The solution from Ex. 4A is added to the polymer pellet mixture and the mixture is further tumble-mixed thoroughly. The solvent is then evaporated at ambient temperature and further dried under vacuum for at least 16 hours. The mixture is then charged into a Haake mini extruder and extruded. The maximum temperature setting for the extruder is 290° C. The extrudate is evaluated by DSC as outlined above and the test results are listed below:

| | | $\Delta H_f$(J/g) | Tm (°C.) |
| --- | --- | --- | --- |
| Isothermal Test: | Original | 14.0 | 254 |
| | 30 min./300° C. | 9.5 | 251 |

From the above examples, it can be seen that the incorporation of the stabilizer of this invention at elevated processing temperatures, i.e., above about 285° C., prevents transesterification and maintains the properties of the blend.

In view of the disclosure, many modifications of this invention will be apparent to those skilled in the art. It is intended that all such modifications which fall within the true scope of this invention be included within the terms of the appended claims.

We claim:

1. A stabilizer useful to retard transesterification in moldable polymer blends comprising polyester, wherein the stabilizer comprises:
   I. a phosphate-epoxy adduct which is the reaction product of:
      (A) phosphate being selected from mono- and di- esters of orthophosphoric acid, said mono- and di- ester respectively having two and one ionizable hydrogen atoms; and
      (B) epoxy; wherein said phosphate and said epoxy are reacted in amounts so as to react at least about one of said ionizable hydrogen atoms of said phosphate with an epoxide group of said epoxy, and
   II. a mixture of:
      (i) reactive functionality component selected from compounds having (1) imide or (2) oxazoline functionality; and
      (ii) hindered phenol component;
   wherein said phosphate-epoxy adduct comprises at least about 51 weight percent of said stabilizer.

2. The stabilizer according to claim 1, wherein said phosphate-epoxy adduct comprises between about 51 and about 75 weight percent of said stabilizer.

3. The stabilizer according to claim 1, wherein said phosphate is selected from said mono- and di- esters containing at least one phenyl group per molecule.

4. The stabilizer according to claim 1, wherein said reactive functionality component is selected from carbodiimides and polymeric styrene having oxazoline functionality on its backbone.

* * * * *